US010291172B2

(12) United States Patent
Barfus et al.

(10) Patent No.: US 10,291,172 B2
(45) Date of Patent: *May 14, 2019

(54) PORTABLE APPLIANCE MOTOR CONTROL WITH SPEED-BASED CURRENT LIMITATION

(71) Applicant: WHIRLPOOL CORPORATION, Benton Harbor, MI (US)

(72) Inventors: Dan Christian Barfus, St. Joseph, MI (US); Wayne Weaver Conard, St. Joseph, MI (US); Alex Lai, Shenzhen (CN); Rainman Xiao, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,708

(22) Filed: Sep. 20, 2017

(65) Prior Publication Data

US 2018/0013374 A1 Jan. 11, 2018

Related U.S. Application Data

(63) Continuation of application No. 13/882,203, filed as application No. PCT/CN2010/001750 on Nov. 2, 2010, now Pat. No. 9,780,718.

(51) Int. Cl.
*B01F 7/00* (2006.01)
*A47J 43/08* (2006.01)
(Continued)

(52) U.S. Cl.
CPC ............ *H02P 29/028* (2013.01); *A47J 43/08* (2013.01); *B01F 7/00325* (2013.01); *B01F 15/00389* (2013.01); *H02P 29/032* (2016.02)

(58) Field of Classification Search
None
See application file for complete search history.

(56) References Cited

U.S. PATENT DOCUMENTS 3,465,224 A 9/1969 Takeyasu
4,814,675 A 3/1989 Perilhon
(Continued)

FOREIGN PATENT DOCUMENTS

CN 1595790 A 3/2005
CN 101252340 A 8/2008
(Continued)

OTHER PUBLICATIONS

European Search Report, Application No. EP16158791, dated Jun. 3, 2016, 8 pages.
(Continued)

*Primary Examiner* — Eduardo Colon Santana
*Assistant Examiner* — Said Bouziane
(74) *Attorney, Agent, or Firm* — Price Heneveld LLP

(57) ABSTRACT

A method of controlling a portable appliance includes measuring an input current supplied to a motor of the portable appliance and measuring a rotational speed of a shaft of the motor. The method also includes determining a current limit based on the rotational speed of the shaft using a substantially continuous function which relates a domain of rotational speeds to a range of current limits. The method further includes reducing, when the input current exceeds the current limit, the rotational speed of the shaft incrementally along the substantially continuous function until the input current is approximately equal to the current limit.

19 Claims, 5 Drawing Sheets

(51) Int. Cl.
*B01F 15/00* (2006.01)
*H02P 29/028* (2016.01)
*H02P 29/032* (2016.01)

(56) References Cited

U.S. PATENT DOCUMENTS

| | | | |
|---|---|---|---|
| 6,548,975 B2 | 4/2003 | Kleinau et al. | |
| 6,556,778 B2 | 4/2003 | Zhang et al. | |
| 6,995,534 B2 | 2/2006 | Berroth et al. | |
| 7,012,393 B2 | 3/2006 | DeFrutos et al. | |
| 7,235,940 B2* | 6/2007 | Bosch | B25B 23/147 173/4 |
| 7,882,734 B2 | 2/2011 | Ciancimino et al. | |
| 8,054,018 B2* | 11/2011 | Jeung | F04D 27/004 165/200 |
| 2005/0057207 A1* | 3/2005 | Bosch | B25B 23/147 318/375 |
| 2007/0176579 A1 | 8/2007 | O'Gorman et al. | |
| 2008/0150460 A1* | 6/2008 | Rosskamp | A01D 69/02 318/434 |
| 2009/0110788 A1 | 4/2009 | Ciancimino et al. | |
| 2009/0243525 A1 | 10/2009 | Ikeda et al. | |
| 2011/0006714 A1* | 1/2011 | Hui | H02P 6/007 318/400.32 |
| 2011/0148332 A1* | 6/2011 | Kawano | B25F 5/00 318/244 |
| 2012/0013281 A1 | 1/2012 | Watanabe | |
| 2012/0262101 A1 | 10/2012 | Rudich et al. | |
| 2013/0020102 A1* | 1/2013 | Bjornlinger | B25F 5/00 173/2 |
| 2013/0026959 A1* | 1/2013 | Sonoda | H02P 29/02 318/400.15 |

FOREIGN PATENT DOCUMENTS

| | | |
|---|---|---|
| CN | 101473527 A | 7/2009 |
| EP | 2012426 A2 | 1/2009 |
| GB | 2406005 A | 3/2005 |
| JP | 2002138966 A | 5/2002 |

OTHER PUBLICATIONS

International Search Report, Application No. PCT/CN2010/001750, 2 pages.
Supplementary European Search Report, Application No. EP10859132, dated Oct. 10, 2014, 2 pages.

* cited by examiner

PORTABLE APPLIANCE MOTOR CONTROL WITH SPEED-BASED CURRENT LIMITATION

CROSS-REFERENCE TO RELATE APPLICATION

This application is a continuation of U.S. patent application Ser. No. 13/882,203, filed Apr. 29, 2013, and entitled "PORTABLE APPLIANCE MOTOR CONTROL WITH SPEED-BASED CURRENT LIMITATION," now U.S. Pat. No. 9,780,718, issued on Oct. 3, 2017, which is a National Stage Entry of PCT/CN2010/001750. The entire disclosures of the above-identified applications are incorporated herein by reference.

TECHNICAL FIELD

The present disclosure relates generally to portable appliances, such as stand mixers. The present disclosure relates more particularly to a method of controlling a motor of a portable appliance in which a current limit is determined based on a rotational speed of a shaft of the motor.

BACKGROUND ART

A portable appliance, or small appliance, is a device which may be used in the preparation of meals and other foodstuffs. Typically, portable appliances are intended to be used in a handheld manner or on tabletops, countertops, or other platforms. Many portable appliances include a motor and electronics to control the operation of the motor. Illustrative examples of such portable appliances include stand mixers, hand mixers, blenders, immersion blenders, juicers, and food processors.

DISCLOSURE OF INVENTION

According to one aspect of this disclosure, a method of controlling a portable appliance includes measuring an input current supplied to a motor of the portable appliance and measuring a rotational speed of a shaft of the motor. The method also includes determining a current limit based on the rotational speed of the shaft using a substantially continuous function which relates a domain of rotational speeds to a range of current limits. The method further includes reducing, when the input current exceeds the current limit, the rotational speed of the shaft incrementally along the substantially continuous function until the input current is approximately equal to the current limit.

In some embodiments, measuring the input current supplied to the motor may include periodically sampling, at a first sampling rate, an output signal of a current sensor. Measuring the rotational speed of the shaft of the motor may include periodically sampling, at a second sampling rate, an output signal of an RPM sensor. The first and second sampling rates each may have a greater frequency than a periodic drive signal used to drive the motor.

In some embodiments, determining the current limit using the substantially continuous function may include calculating the output of a linear function with the rotational speed of the shaft as the input. In other embodiments, determining the current limit using the substantially continuous function may include calculating the output of a non-linear function with the rotational speed of the shaft as the input. In still other embodiments, determining the current limit using the substantially continuous function may include retrieving a value which corresponds to the rotational speed of the shaft from a look-up table.

In other embodiments, reducing the rotational speed of the shaft incrementally along the substantially continuous function may comprise, iteratively, (i) reducing the rotational speed of the shaft by an increment, (ii) measuring a new rotational speed of the shaft, (iii) measuring a new input current, and (iv) determining a new current limit based on the new rotational speed of the shaft using the substantially continuous function, until the new input current is approximately equal to the new current limit. In such embodiments, each iteration of steps (i)-(iv) may be performed within a period of a periodic drive signal used to drive the motor.

In some embodiments, the method may further include operating the motor using a proportional-integral-derivative (PID) algorithm to maintain the rotational speed of the shaft at a desired speed setting, until the input current equals the current limit. In such embodiments, the method may further include incrementally increasing a previously reduced rotational speed of the shaft, when the input current is less than the current limit and until the rotational speed of the shaft is approximately equal to the desired speed setting.

According to another aspect, a mixer includes a user control operable to generate an input signal indicative of a desired speed setting for the mixer and a motor having a shaft configured to provide motive power to a mixing element. The mixer also includes a current sensor operable to generate a current signal indicative of an input current supplied to the motor and an RPM sensor operable to generate a speed signal indicative of a rotational speed of the shaft of the motor. The mixer further includes an electronic controller operable to (i) generate a motor control signal such that the rotational speed of the shaft corresponds to the desired speed setting, (ii) calculate a current limit based on the speed signal using a substantially continuous function which relates a domain of rotational speeds of the shaft to a range of current limits, and (iii) modify the motor control signal, when the current signal exceeds the current limit, such that the rotational speed of the shaft is incrementally reduced along the substantially continuous function until the current signal is approximately equal to the current limit.

In some embodiments, the current signal exceeding the current limit may be associated with a pinch point between the mixing element and a mixer bowl that receives the mixing element. The substantially continuous function may comprise one of a linear function, non-linear function, and a look-up table. The mixer may further include a driver circuit operable to generate a periodic drive signal to drive the motor in response to the motor control signal. The electronic controller may further be operable to, at least once during each period of the periodic drive signal, (i) calculate a new current limit based on the speed signal using the substantially continuous function and (ii) modify the motor control signal, when the current signal exceeds the new current limit, such that an average current of the periodic drive signal is incrementally reduced.

According to yet another aspect, a tangible, machine readable medium comprises a plurality of instructions that, in response to being executed, result in an electronic controller receiving an input signal indicative of a desired speed setting for a portable appliance having a motor, generating a motor control signal such that a rotational speed of a shaft of the motor corresponds to the desired speed setting, receiving a speed signal indicative of the rotational speed of the shaft, receiving a current signal indicative of an input current supplied to the motor, calculating a current limit based on the speed signal using a substantially continuous function which relates a domain of rotational speeds of the shaft to a range of current limits, and modifying the motor control signal, when the current signal exceeds the current limit, such that the rotational speed of the shaft is incrementally reduced along the substantially continuous function until the current signal is approximately equal to the current limit.

In some embodiments, the plurality of instructions, in response to being executed, may further result in the electronic controller modifying the motor control signal using a proportional-integral-derivative (PID) algorithm to maintain the rotational speed of the shaft at the desired speed setting, until the current signal equals the current limit. In other embodiments, using the substantially continuous function may comprise using one of a linear function, non-linear function, and a look-up table.

In other embodiments, modifying the motor control signal may include, iteratively, (i) generating a modified motor control signal such that the rotational speed of the shaft is reduced by an increment, (ii) calculating a new current limit based on the speed signal using the substantially continuous function, until the current signal is approximately equal to the new current limit. In such embodiments, each iteration of steps (i)-(ii) may be performed within a period of a periodic drive signal used to drive the motor. The plurality of instructions, in response to being executed, may further result in the electronic controller modifying the motor control signal such that the rotational speed of the shaft is incrementally increased along the substantially continuous function, when the current signal is less than the current limit and until the rotational speed of the shaft corresponds to the desired speed setting.

BRIEF DESCRIPTION OF DRAWINGS

The detailed description particularly refers to the following figures, in which.

BEST MODE(S) FOR CARRYING OUT THE INVENTION

Figure 1:
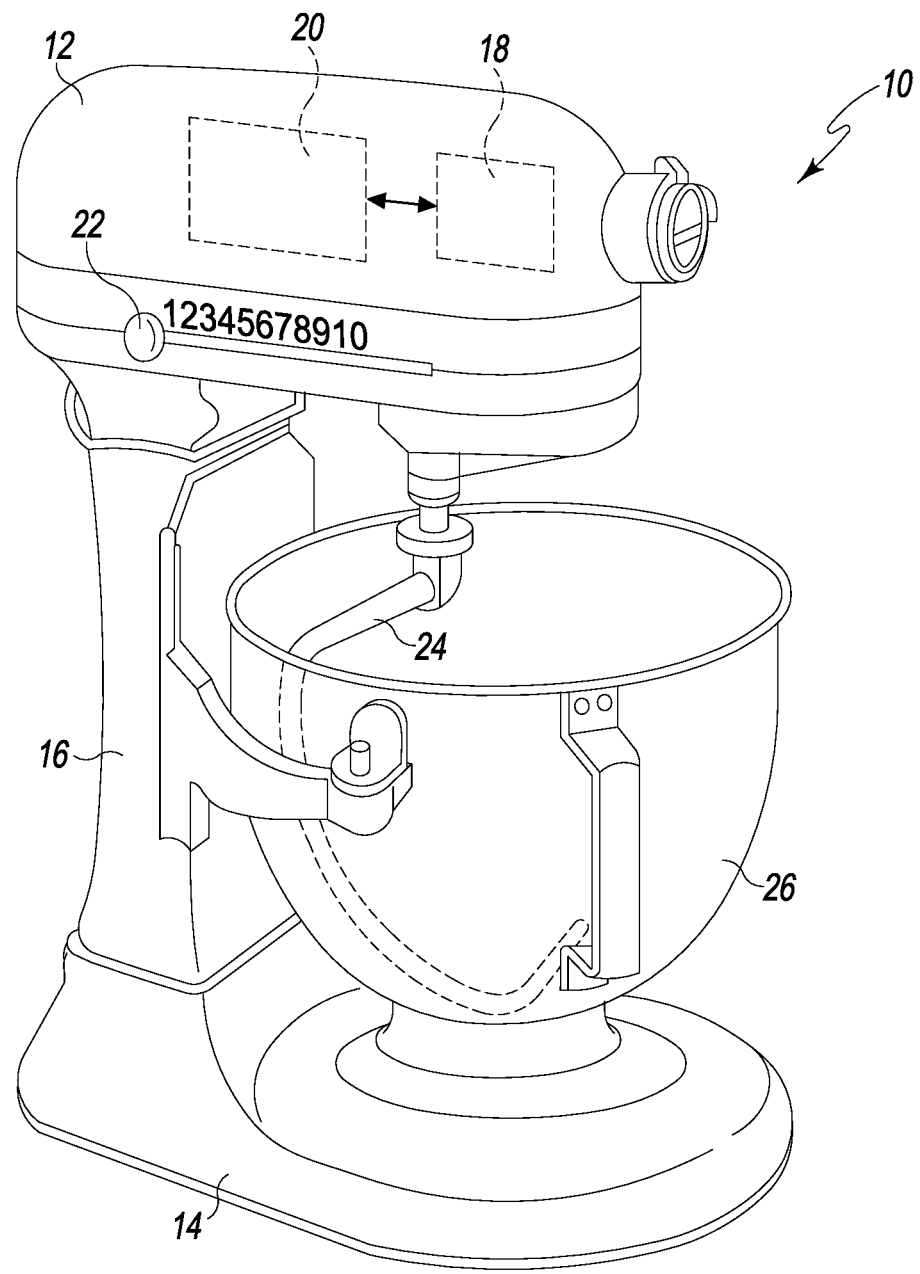
FIG. 1 is a perspective view of a portable appliance, embodied as a stand mixer having a dough hook.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

A portable appliance 10, illustratively embodied as a stand mixer 10, is shown in FIG. 1. The stand mixer 10 has a mixer head 12 and a base 14 having an upstanding pedestal portion 16 supporting the mixer head 12. The mixer head 12 encases a motor 18 and associated electronic motor controls 20, which are shown in phantom. In some embodiments, the motor 18 and/or the motor controls 20 may alternatively be located in the base 14, including the upstanding pedestal portion 16.

A user control 22 is also included on the stand mixer 10. The user control 22 is illustratively embodied in FIG. 1 as a sliding speed control knob 22 mounted in the mixer head 12. The user may choose a desired speed setting with the control knob 22, and the motor controls 20 will generally attempt to operate the motor 18 at the desired speed. As shown in FIG. 1, the sliding speed control knob 22 is configured for multiple discrete speeds, indexed from 0 to 10, with an increment of 1. It will be appreciated that in other embodiments the user control 22 may be any type of analog or digital user interface operable to input a desired speed setting for the stand mixer 10.

The stand mixer 10 includes several mixing elements 24 which may be releasably attached to the mixer head 12 for rotation thereby. A mixing element 24 embodied as a dough hook 24 is shown (partially in phantom) in FIG. 1. Other possible mixing elements include a wire whip, a flat beater, and the like. These mixing elements 24 mix foodstuffs and other items in a mixer bowl 26, which is supported on the base 14. In the illustrative embodiment, the motor 18 is configured to provide motive power to the mixing element 24 via a planetary gear system. Exemplary planetary gear systems and their operation are described in U.S. patent application Ser. No. 11/930,900 (entitled "Utilizing Motor Current Variations to Control Mixer Operation") and Ser. No. 11/931,114 (entitled "Smoothing Motor Speed During Mixing"), both of which were filed Oct. 31, 2007, are assigned to the assignee of the present application, and are expressly incorporated by reference herein in their entirety. As described therein, the use of the planetary gear system creates a complex rotational motion for the mixing element 24 (e.g., the dough hook 24) because the mixing element 24 both orbits around the axis of rotation of a sun gear and rotates along the axis of rotation of a planetary gear to which it is coupled.

Figure 2:
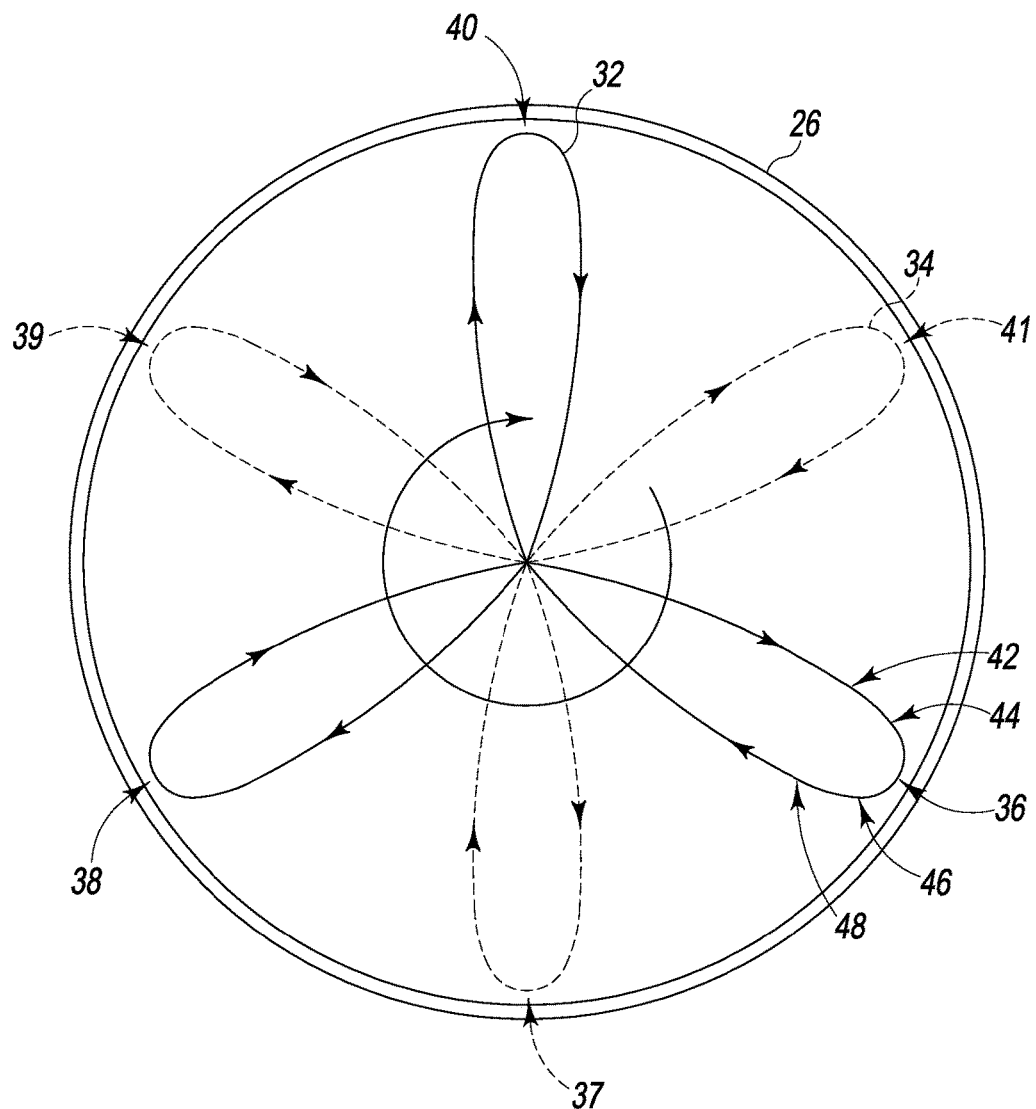
FIG. 2 is a schematic representation illustrating a complex rotational motion of the dough hook of FIG. 1.

The complex rotational motion of the dough hook 24 within the mixer bowl 26 is illustrated in FIG. 2. The path taken by a shaft of the dough hook 24 is represented by line 30. Portions of the path taken by an outermost point of the dough hook 24 are represented by lines 32, 34. For example, the movement of the outermost portion of the dough hook 24 during a first full planetary gear rotation is illustrated by line 32, while the movement of the outermost portion of the dough hook 24 during a second full planetary gear rotation is illustrated (in phantom) by line 34. Thus, the path taken by the outermost point of the dough hook 24 advances relative to the mixer bowl 26 for each orbit about the sun gear. In other words, the path of the outermost point of the dough hook 24 is not repetitive or fixed relative to the mixer bowl 26.

As can been seen in FIG. 2, this complex rotational movement creates several pinch points 36, 37, 38, 39, 40, 41 where the distance between the outermost point of the dough hook 24 and the mixer bowl 26 is at a minimum. It will be appreciated that the locations of the pinch points 36-41 is a physical feature that will vary depending on the particular stand mixer 10. During all phases of the rotation of the dough hook, there is an intermittent grabbing and slipping of foodstuffs (e.g., dough) with respect to the dough hook 24 and the mixer bowl 26 that results in an intermittent application of the weight of the foodstuff to the motor 18 (i.e., an intermittent or instantaneous loading and unloading of the motor 18). The pinch points 36-41, however, represent the times of highest loading for the motor 18. For example, as the outermost point of the dough hook 24 passes through points 42, 44 and nears the pinch point 36, the load on the motor 18 will gradually increase. Conversely, after the outermost point of the dough hook 24 passes the pinch point 36 and subsequently passes through points 46, 48, the load on the motor 18 will gradually decrease. It will also be appreciated that the timing, magnitude, and frequency of the intermittent or instantaneous loading of the motor 18 may be impacted by factors other than the location of the pinch points 36-41, such as the type of foodstuff being mixed, by way of example.

Figure 3:
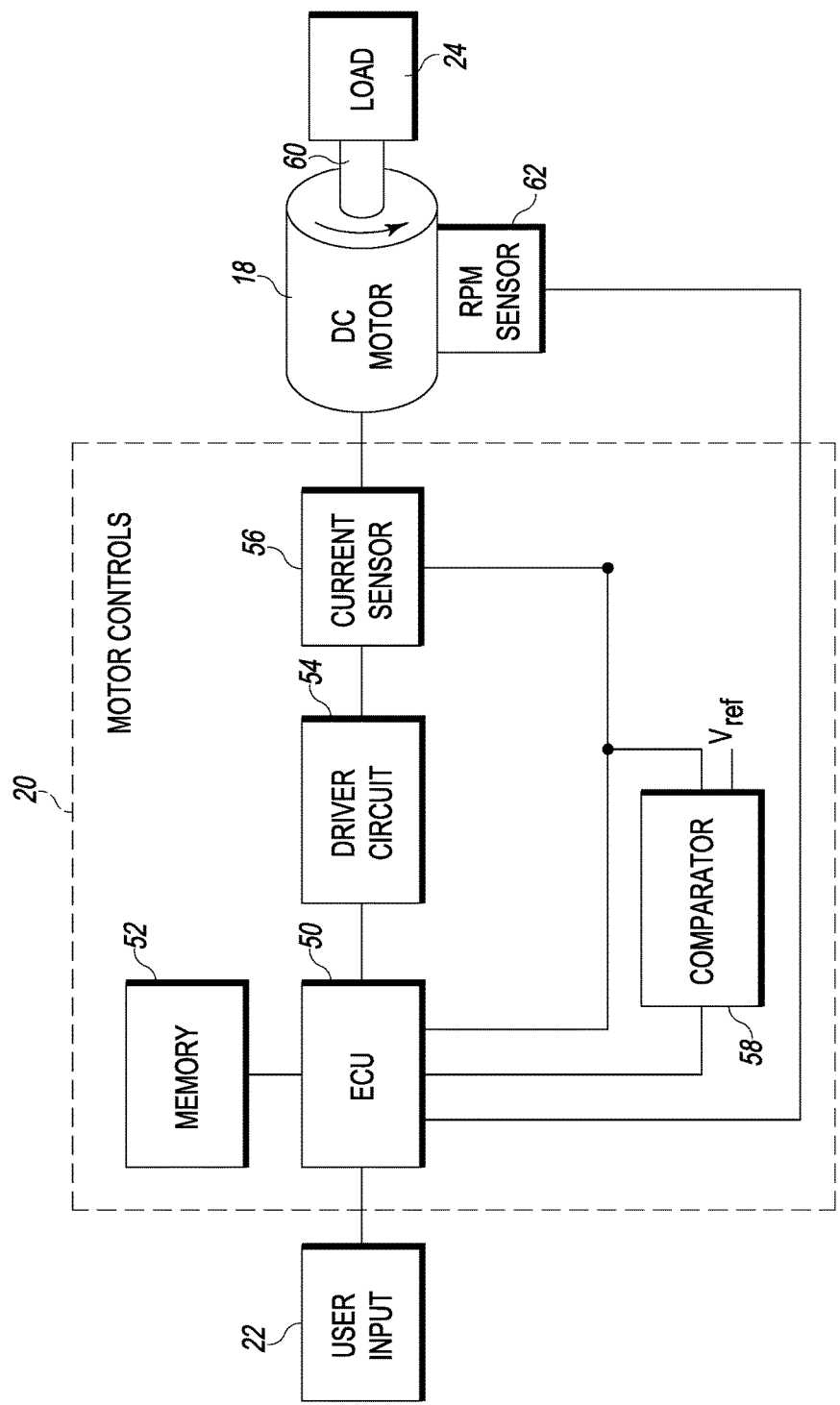
FIG. 3 is a block diagram illustrating a motor and associated motor controls of the stand mixer of FIG. 1.

Referring now to FIG. 3, the motor 18 and associated motor controls 20, according to one illustrative embodiment, are shown as a simplified block diagram. These components are labeled using the same reference numerals as FIG. 1, and similar components are labeled using similar reference numerals in all figures throughout this disclosure. The motor controls 20 may include an electronic control unit (ECU) or "electronic controller" 50, a memory device 52, a driver circuit 54, a current sensor 56, and a comparator 58. In some embodiments, the user control 22 may also be incorporated into motor controls 20. In other embodiments (such as that shown in FIG. 3), the user control 22 is separated from the motor controls 20 but provides an input signal to the electronic controller 50. It should also be appreciated that some components of the motor controls 20 (e.g., a power supply circuit) are not shown in FIG. 3 for the sake of clarity.

As previously mentioned, the stand mixer 10 utilizes a motor 18 to provide motive power to the mixing element 24. The motor 18 may illustratively be embodied as a brushed, brushless, or stepper direct current (DC) motor, a universal motor, or the like. The motor 18 includes a shaft 60 which revolves about its axis when power is supplied to the motor 18. This shaft 60 may be characterized by its rotational speed, or angular velocity. The shaft 60, in turn, transfers its motion to a mixing element 24, either directly or indirectly via a transmission (e.g., via the planetary gear system in the illustrative embodiment). Interactions between the mixing element 24 and foodstuffs in the mixer bowl 26 may subject the motor 18 and the transmission to intermittent or instantaneous loading, as described above.

The rotational speed of the shaft 60 of motor 18 may be measured by an RPM (revolutions-per-minute) sensor 62. Any type of sensor capable of measuring rotational speed or angular velocity may be used as the RPM sensor 62. The RPM sensor 62 may illustratively be embodied as a Hall-effect sensor 62 in cases where the motor 18 includes a ring magnet which revolves with the shaft 60. A Hall-effect sensor 62 responds to changes in magnetic fields within its proximity by altering the magnitude of an output voltage. Thus, the Hall-effect sensor 62 will generate an output signal indicative of a rotational speed of the shaft 60 of motor 18. In some embodiments, the output signal of sensor 62 may be an analog voltage that represents the rotational frequency of shaft 60 (for example, in Hertz). As shown in FIG. 3, this output signal is provided to the electronic controller 50.

The motor 18 of FIG. 3 is driven by a periodic drive signal that is generated by the driver circuit 54. The periodic drive signal may be illustratively embodied as a pulse-width-modulation (PWM) signal having a constant frequency and amplitude, but a variable duty cycle (i.e., "on time" versus "off time"). In such embodiments, the driver circuit 54 receives a motor control signal from the electronic controller 50 and generates a PWM signal of a particular duty cycle in response to the motor control signal. To generate the PWM signal, the driver circuit 54 may switch a field-effect transistor (FET) in response to the motor control signal. As the duty cycle of the PWM signal increases, larger average currents will be delivered to the motor 18, and the shaft 60 will operate at higher rotational speeds (when torque is constant). In other embodiments, the driver circuit 54 may instead include a triac ("triode for alternating current," also known as a bidirectional triode thyristor) configured to generate a generally sinusoidal periodic drive signal. In such embodiments, a motor control signal from the electronic controller 50 may trigger the triac at different phase angles during each half-cycle of an AC supply voltage, resulting in varying average current values for the periodic drive signal. It will be appreciated by those of skill in the art that many types of driver circuits and periodic drive signals are possible.

The input current supplied to the motor 18 is measured by a current sensor 56. Any type of sensor capable of measuring an electrical current may be used as the current sensor 56. The current sensor 56 may illustratively be embodied as an amplifier that measures the voltage across a small resistor coupled in series with the motor 18. The voltage output of this amplifier will be proportional to the input current supplied to the motor 18. Thus, the current sensor 56 will generate an output signal indicative of an input current supplied to the motor 18. As shown in FIG. 3, this output signal is provided to the electronic controller 50. In other embodiments, the current sensor 56 may inductively sense the input current supplied to the motor 18.

The output signal of the current sensor 56 is also provided as one of the two inputs of a comparator 58. The other input of the comparator 58 is a reference voltage $V_{ref}$. The comparator 58 has a digital, or binary, output signal representing whether the input current of the motor 18 has exceeded a predetermined threshold (represented by $V_{ref}$). In some embodiments, the voltage comparator 58 may be illustratively embodied as an amplifier that outputs a "low" signal when the magnitude of the voltage provided by the current sensor 56 is less than the magnitude of $V_{ref}$ and that outputs a "high" signal when the magnitude of the voltage provided by the current sensor 56 is greater than the magnitude of $V_{ref}$. The magnitude of the reference voltage $V_{ref}$ may be adjusted by the electronic controller 50 to set various thresholds.

The motor controls 20 also include an electronic controller 50. The electronic controller 50 is, in essence, the master computer responsible for interpreting electrical signals sent by sensors associated with the stand mixer 10 and for activating or energizing electronically-controlled components associated with the stand mixer 10. For example, the electronic controller 50 is configured to control operation of the motor 18, to monitor various signals from the user control 22, the current sensor 56, the comparator 58, and the RPM sensor 62, and to determine whether the stand mixer 10 should operate in a current limitation mode, amongst many other things. In particular, as will be described in more detail below with reference to FIGS. 4 and 5, the electronic controller 50 is operable to generate a motor control signal such that the rotational speed of the shaft 60 corresponds to a desired speed setting, calculate a current limit based on a speed signal from the RPM sensor 62 using a substantially continuous function which relates a domain of rotational speeds of the shaft to a range of current limits, and modify the motor control signal, when a current signal from the current sensor 56 exceeds the current limit, such that the rotational speed of the shaft 60 is incrementally reduced along the substantially continuous function until the current signal is approximately equal to the current limit.

To do so, the electronic controller 50 includes a number of electronic components commonly associated with electronic units utilized in the control of electromechanical systems. For example, the electronic controller 50 may include, amongst other components customarily included in such devices, a processor, such as a microprocessor. The microprocessor of the electronic controller 50 may interface with a memory device 52, such as a programmable read-only memory device ("PROM"), including erasable PROM's (EPROM's or EEPROM's). In some embodiments, the memory device 52 may be a component of the electronic controller 50. The memory device 52 is provided to store, amongst other things, instructions in the form of, for example, a software routine (or routines) which, when executed by the microprocessor, allows the electronic controller 50 to control operation of the stand mixer 10.

The electronic controller 50 may also include an analog interface circuit. The analog interface circuit converts the output signals from various sensors (e.g., the RPM sensor 62) into signals which are suitable for presentation to an input of the microprocessor. In particular, the analog interface circuit, by use of an analog-to-digital (A/D) converter or the like, converts the analog signals generated by the sensors into digital signals for use by the microprocessor. It should be appreciated that the A/D converter may be embodied as a discrete device or number of devices, or may be integrated into the microprocessor. It should also be appreciated that if any one or more of the sensors associated with the stand mixer 10 generate a digital output signal, the analog interface circuit may be bypassed.

Similarly, the analog interface circuit converts signals from the microprocessor into output signals which are suitable for presentation to the electrically-controlled components associated with the stand mixer 10 (e.g., the driver circuit 54). In particular, the analog interface circuit, by use of a digital-to-analog (D/A) converter or the like, converts the digital signals generated by the microprocessor into analog signals for use by the electronically-controlled components associated with the stand mixer 10. It should be appreciated that, similar to the A/D converter described above, the D/A converter may be embodied as a discrete device or number of devices, or may be integrated into the microprocessor. It should also be appreciated that if any one or more of the electronically-controlled components associated with the stand mixer 10 operate on a digital input signal, the analog interface circuit may be bypassed.

Thus, the electronic controller 50 may control operation of the motor 18. In particular, the electronic controller 50 executes a routine including, amongst other things, a control scheme in which the electronic controller 50 monitors outputs of the sensors associated with the stand mixer 10 to control the inputs to the electronically-controlled components associated therewith. To do so, the electronic controller 50 communicates with the sensors associated with the stand mixer 10 to determine, amongst numerous other things, the input current of the motor 18 and/or the rotational speed of the shaft 60 of the motor 18. Armed with this data, the electronic controller 50 performs numerous calculations, either continuously or intermittently, including looking up values in preprogrammed tables, in order to execute algorithms to generate a motor control signal and provide this signal to the driver circuit 54.

Figure 4:
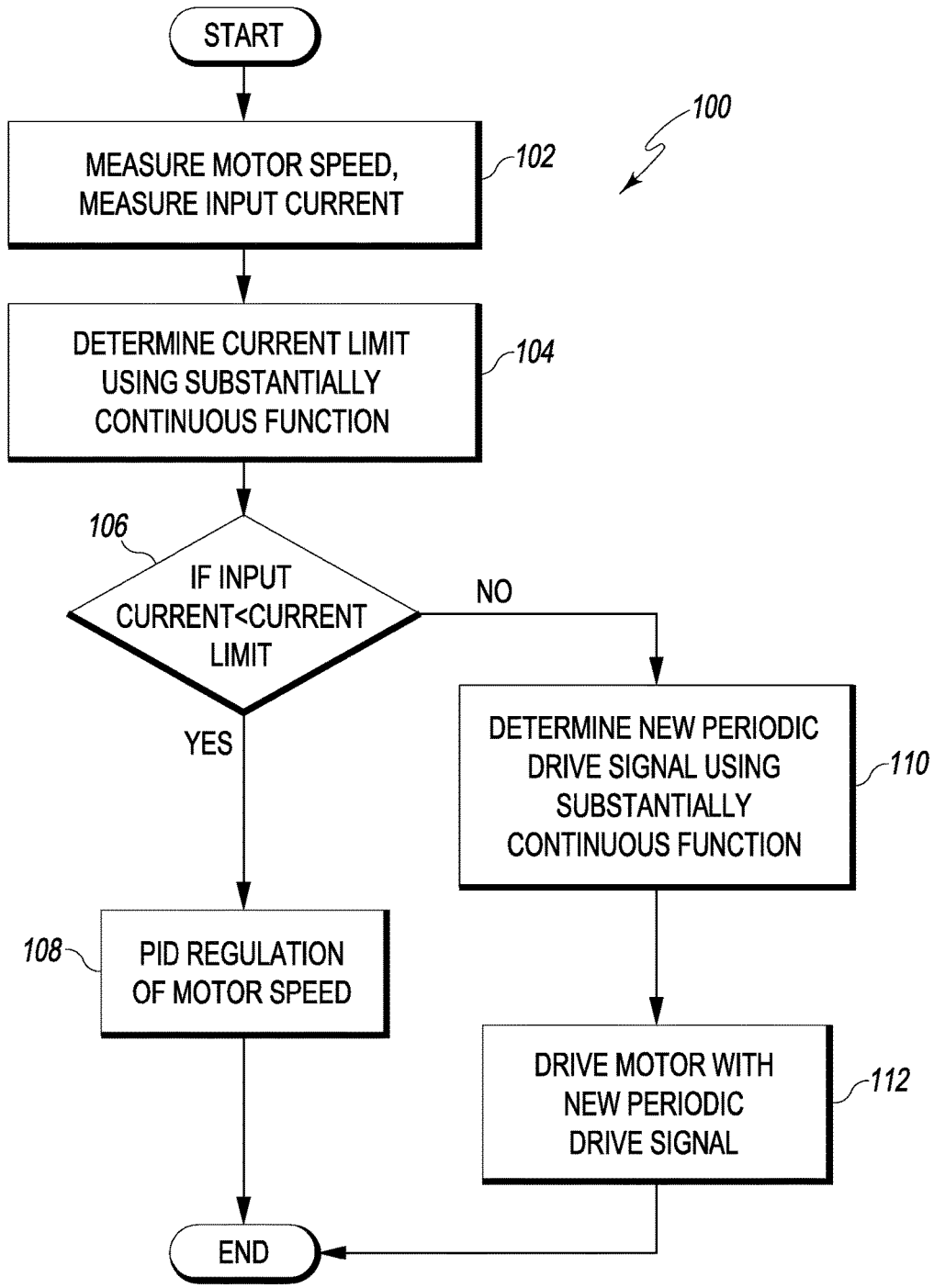
FIG. 4 is flowchart illustrating an operational algorithm of the motor controls of FIG. 3.

Referring now to FIG. 4, an illustrative embodiment of a method of controlling the motor 18 using the motor controls 20 of FIG. 3 is illustrated as a simplified flow diagram. The process 100 may be executed by the electronic controller 50 with inputs from the other components of the stand mixer 10, as described above. The process 100 will generally be performed iteratively, or cyclically, by the electronic controller 50. In some embodiments, the electronic controller 50 may complete the process 100 within each period of the periodic drive signal generated by the driver circuit 54. For instance, where the frequency of the periodic drive signal is 15.6 kHz, the electronic controller 50 may complete the process 100 in fewer than 64 microseconds during each cycle of the periodic drive signal. It is contemplated that periodic drive signals having other frequencies may alternatively be used. The process 100 includes a number of process steps 102-112, as shown in FIG. 4.

Prior to the electronic controller 50 executing the process 100, a user will place foodstuffs in the mixer bowl 26 of the stand mixer 10, attach a mixing element 24, and slide the control knob 22 from "0" to a desired setting (e.g., "Setting 3"). The electronic controller 50 will receive an input signal from the user control 22 indicative of the desired setting. The electronic controller 50 will begin generating a motor control signal corresponding to the desired setting and provide this motor control signal to the driver circuit 54. The driver circuit 54 will, in turn, generate a periodic drive signal to drive the motor 18 such that the rotational speed of the shaft 60 of motor 18 corresponds to the desired setting.

The rotational speed with which the motor 18 operates the shaft 60 (and, hence, the mixing element 24), however, will vary with both the periodic drive signal and the load applied to the motor 18. The general relationship between motor speed (i.e., rotational speed of the shaft 60) and motor current for the motor 18 is illustrated graphically in FIG. 5. By way of example, a large batch of cookie dough mixed at "Setting 3" may initially draw an input current of approximately 7 amps (point 126 in FIG. 5). As the mixing element 24 encounters the cookie dough in mixer bowl 26, an increasing load will be applied to the motor 18 (e.g., at one of the pinch points 36-41 shown in FIG. 2), and the rotational speed of the shaft 60 may slow below the desired speed setting. Increasing the average current delivered by the periodic drive signal may achieve the desired speed, despite load variations, but may also risk damaging the motor 18. To simultaneously manage both motor speed and motor current, the electronic controller 50 may execute process 100.

The process 100 begins with process step 102, in which the electronic controller 50 measures the rotational speed of the shaft 60 of motor 18 and measures an input current supplied to the motor 18. The electronic controller 50 measures these quantities, respectively, by receiving a speed signal from the RPM sensor 62 that is indicative of the rotational speed of the shaft 60 and by receiving a current signal from the current sensor 56 that is indicative of the input current supplied to the motor 18. In some embodiments, the RPM sensor 62 and the current sensor 56 both generate these analog signals and provide them to the electronic controller 50 on a continuous basis. In such embodiments, the analog interface circuit of the electronic controller 50 will convert these signals into digital values, as described above. In particular, an A/D converter of the electronic controller 50 is operable to sample these signals at a predetermined sampling rate. The respective sampling rates for the speed signal and the current signal (which may or may not be equal) may have a greater frequency than the periodic drive signal generated by the driver circuit 54. This greater frequency allows the signals to be sampled, and the process 100 to be executed, at least once during each period of the periodic drive signal, as described above.

Figure 5:
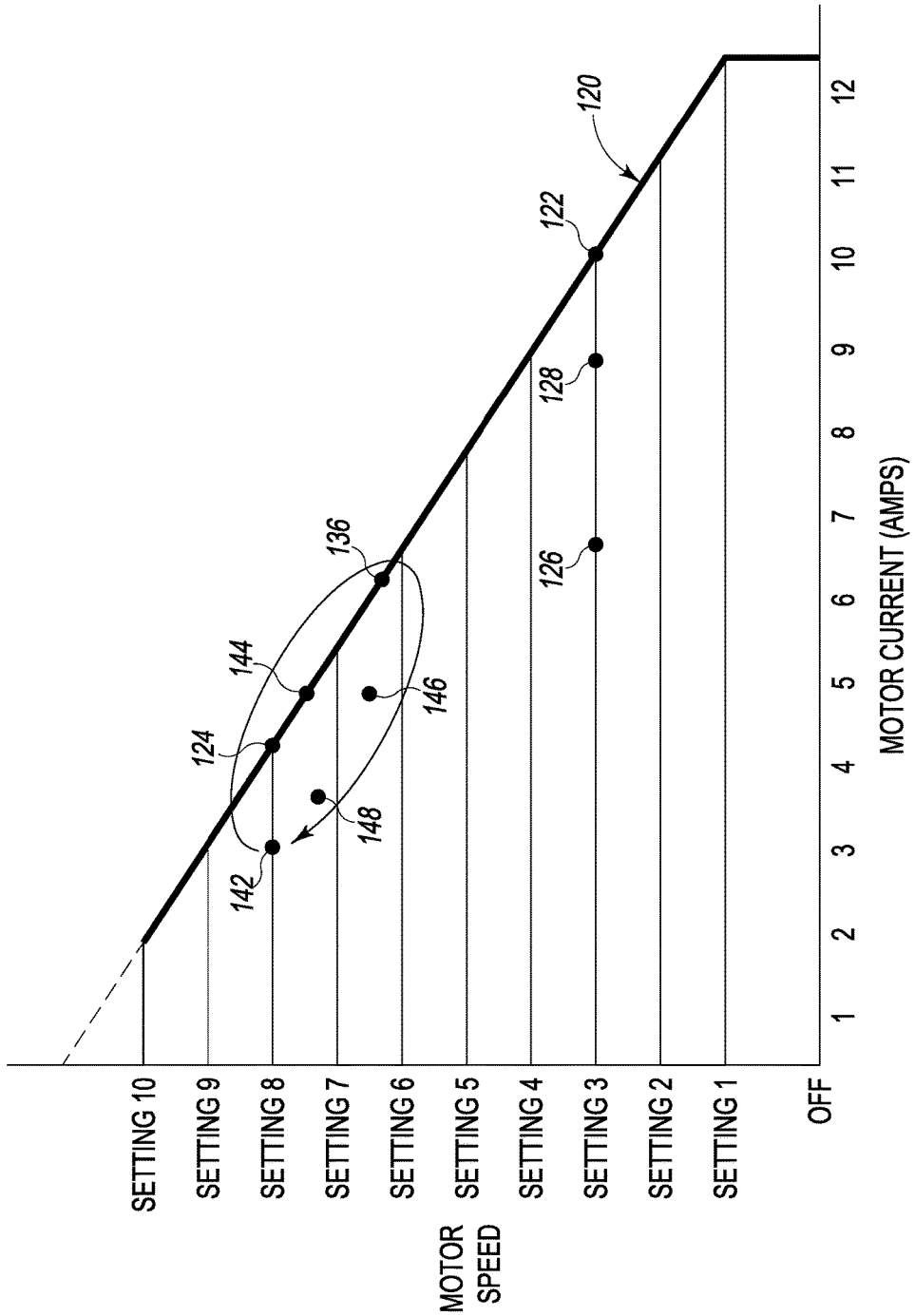
FIG. 5 is a graph illustrating various settings and currents of the motor of FIG. 3 when operated according to the algorithm of FIG. 4.

After process step 102, the process 100 proceeds to process step 104, in which the electronic controller 50 determines a current limit based on the rotational speed of the shaft 60 using a substantially continuous function which relates a domain of rotational speeds to a range of current limits. What is meant herein by the term "substantially continuous function" is a function for which the following relationship generally holds: the output of the function as the input approaches a value is equal to the output of the function at that value, for all inputs in the domain of the function. In other words, relatively small changes in the input (rotational speed) result in relatively small changes in the output (current limit). In contrast, a step-wise function is a discontinuous function, not a substantially continuous function. One embodiment of a substantially continuous function 120 relating rotational speeds of the shaft 60 to corresponding current limits over the domain of operating speeds of the stand mixer 10 ("Setting 1" to "Setting 10") is shown in FIG. 5.

In process step 104, the electronic controller 50 calculates a current limit based on the rotational speed measured in process step 102. In some embodiments, the electronic controller 50 uses a substantially continuous function 120 having the form of a linear function 120, as shown in FIG. 5. In other embodiments, the substantially continuous function may have the form of a non-linear function. In either of these cases, the electronic controller 50 may calculate a current limit as the output of the function with the measured rotational speed as the input. In still other embodiments, the electronic controller 50 may retrieve a current limit value corresponding to the measured rotational speed from a preprogrammed look-up table approximating a continuous function. A look-up table must have a sufficiently large number of data points to be a substantially continuous function (i.e. changes in rotational speed throughout the domain must appear smooth, not jerky, to a user of the stand mixer 10). Returning to the example of mixing a large batch of cookie dough mixed at "Setting 3," the electronic controller 50 would determine the current limit to be point 122 on the function 120, as shown in FIG. 5.

After process step 104, the process 100 proceeds to process step 106, in which the electronic controller 50 determines whether the input current measured in process step 102 has exceeded the current limit determined in process step 104. In some embodiments, this comparison may be performed with the comparator 58, where $V_{ref}$ has been set by the electronic controller 50 to represent the current limit for the desired speed setting. In such cases, the output of the comparator 58 will signal the electronic controller 50 when the stand mixer 10 should enter the current limitation mode represented by process steps 110-112. If the measured input current is less than the determined current limit, the process 100 instead proceeds to process step 108, in which the electronic controller 50 regulates the speed of motor 18 according to a proportional-integral-derivative (PID) algorithm, after which the process 100 ends. If the measured input current is greater than or equal to the determined current limit, however, the process 100 proceeds to process step 110, which is discussed in more detail below.

If the process 100 proceeds to process step 108, the electronic controller 50 determines the periodic drive signal which should be generated by the driver circuit 54 to achieve the desired setting (e.g., "Setting 3") using a known PID algorithm. A PID algorithm typically utilizes an "error signal" (the desired speed setting less the measured rotational speed), the integral of the error signal, and the derivative of the error signal, to calculate the appropriate periodic drive signal with which to drive the motor 18. So long as the input current supplied to the motor 18 remains below the current limit (point 122 in the "Setting 3" example), the periodic drive signal can be freely adjusted by the PID algorithm to maintain the desired setting. Thus, in the "Setting 3" example, the operating point of the motor 18 may shift between point 126 (smaller load) and point 128 (larger load) to maintain a certain speed. In some embodiments of the process 100 (now shown), process step 108 may be further stratified to apply different types of PID algorithms depending on varying input current thresholds. After the periodic drive signal is (potentially) adjusted in process step 108, the process 100 ends and begins again at process step 102.

Once again, if the input current measured in process step 102 is greater than or equal to the current limit determined in process step 104, process step 106 will direct the process 100 to proceed to process step 110 (rather than process step 108). By way of example, mixing a batch of potatoes at "Setting 8" may cause the input current supplied to the motor 18 to approach or meet the current limit determined by the electronic controller 50 in process step 104 (point 124 on the function 120, for this example). Various points 36, 42, 44, 46, and 48 in the complex rotational motion of the dough hook 24 (as shown in FIG. 2) generally correspond, respectively, to various points 136, 142, 144, 146, and 148 in the relationship between motor speed and motor current shown in FIG. 5. For example, at point 42 in FIG. 2 (in which a relatively small load is placed on the motor 18), the motor speed will remain substantially at "Setting 8," but the input current supplied to the motor 18 will increase toward the current limit 124 as shown by point 142 in FIG. 5. As the dough hook 24 approaches point 44 in FIG. 2, the input current will reach (and begin to exceed) the current limit 124 as shown by point 144 in FIG. 5. In response to the input current reaching the current limit 124, the process 100 will proceed to process step 110.

In process step 110, the electronic controller 50 determines a new periodic drive signal which should be generated by the driver circuit 54 in accordance with the substantially continuous function 120. Using the substantially continuous function 120 to determine the new periodic drive signal will typically result in a slight or incremental, rather than significant, reduction in the average current of the periodic drive signal. The rotational speed of the shaft 60 will not be reduced to the next lowest setting of the user control 22 (e.g., "Setting 7") but, rather, some intermediate value, as shown in FIG. 5. This mode of operation provides for a smooth, rather than jerky, speed transitions for the motor 18. For instance, when the input current reaches the value corresponding to point 144 (exceeding the current limit 124), the electronic controller 50 will calculate a new periodic drive signal with an average current cycle designed to operate the motor 18 at point 144 on the substantially continuous function 120, as shown in FIG. 5. The electronic controller 50 modifies the motor control signal it generates and supplies to the driver circuit 54 in order to cause this change in the periodic drive signal.

After process step 110, the process 100 proceeds to process step 112, in which the newly determined periodic drive signal is generated by the driver circuit 54 and drives the motor 18. As just discussed, the new periodic drive signal should result in an incremental reduction in the rotational speed of the shaft 60. After process step 112, the process 100 ends and begins again at process step 102. Until the input current supplied to the motor 18 returns below the original current limit 124 that was set as $V_{ref}$ at the comparator 58, the process 100 will remain in the current limitation mode and iteratively cycle through process steps 102-106 and 110-112. This current limitation mode may be used to protect the motor 18 from the intermittent or instantaneous loading that accompanies the pinch points 36-41 discussed above with reference to FIG. 2.

During the pass through the process 100 just discussed and shown in FIG. 5, the operational point of the motor 18 was moved to point 144 by modifying the periodic drive signal, in response to determining that the input current at point 144 exceeded the current limit 124, to achieve the incrementally lower speed on the function 120. As the input current continues to increase (due to increased loading of the motor 18 as the dough hook 24 approaches the pinch point 36), the process 100 will repeat and the average current of the periodic drive signal will again be incrementally decreased. This will continue until the pinch point 36 (i.e., the maximum load on the motor 18) has been reached and the input current ceases to increase. This operational point of the motor 18 is represented as point 136 on the substantially continuous function 120 in FIG. 5.

As the dough hook 24 moves away from the pinch point 36, the load on the motor 18 will decrease, causing the input current supplied to the motor 18 to decrease below the determined current limit. During these passes through the process 100, the electronic controller 50 will respond by incrementally increasing the average current of the periodic drive signal and, thus, the rotational speed of the shaft 60 until the rotational speed returns to the desired setting chosen by the user. This incremental increase in the motor speed, returning toward to "Setting 8," is illustrated as points 146 and 148 in FIG. 5. As discussed above, each pass through the process 100 may be performed by the electronic controller 50 within the period of the periodic drive signal used to drive the motor 18. The frequency of these adjustments also contributes to the smooth transitions between motor speeds.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, while portable appliance 10 is herein illustrated as a stand mixer, the features and aspects disclosed herein can also be implemented in other types of portable appliances, such as hand mixers, blenders, immersion blenders, juicers, food processors, and the like. It is also contemplated that the systems and methods of the present disclosure may be applied to motor control in any type of appliance (for example, washers, dryers, refrigerators, freezers, etcetera).

Furthermore, embodiments of the disclosed systems and methods may be implemented in hardware, firmware, software, or any combination thereof. Embodiments of the disclosed systems and methods may also be implemented as instructions stored on a tangible, machine-readable medium, such as the memory device 52, which may be read and executed by one or more electronic controllers 50. A tangible, machine-readable medium may include any mechanism for storing or transmitting information in a form readable by a machine (e.g., an electronic controller 50). For example, a tangible, machine-readable medium may include read only memory (ROM), random access memory (RAM), magnetic disk storage, optical storage, flash memory, and/or other types of memory devices.

There are a plurality of advantages of the present disclosure arising from the various features of the systems and methods described herein. It will be noted that alternative embodiments of the systems and methods of the present disclosure may not include all of the features described yet still benefit from at least some of the advantages of such features. Those of ordinary skill in the art may readily devise their own implementations of the systems and methods that incorporate one or more of the features of the present invention and fall within the spirit and scope of the present disclosure as defined by the appended claims.

What is claimed is:

1. A method of controlling a portable appliance, the method comprising:
   providing a user control that is configured to permit a user to input a desired revolutions-per-minute (RPM);
   measuring an input current supplied to an electric motor of the portable appliance utilizing a current sensor;
   measuring an RPM of a shaft of the electric motor utilizing an RPM sensor;
   using the measured RPM of the shaft to determine a current limit based on a substantially continuous function which defines input current limits as a function of shaft RPM;
   if the measured input current does not exceed the current limit for the measured RPM of the shaft, using a constant RPM mode in which the input current supplied to the electric motor is actively varied to maintain the RPM of the shaft at a desired RPM that has been input by a user;
   if the measured input current exceeds the allowable current limit, using a current limitation mode in which the RPM of the shaft is reduced below the desired RPM that has been input by a user and the electric current is increased to the current limit while the RPM is reduced, such that the RPM of the shaft is varied according to the substantially continuous function and the current is maintained at the current limit according to the substantially continuous function.

2. The method of claim 1, wherein:
   the user control provides a finite number of possible discreet RPM settings;
   when in the current limitation mode, causing the electric motor to operate at an RPM that is less than a desired RPM set by a user but greater than the next lowest RPM settings.

3. The method of claim 2, wherein:
   the same substantially continuous function is utilized for all possible RPM settings.

4. The method of claim 1, including:
   utilizing a controller to calculate an electrical current limit using the measured RPM as the input.

5. The method of claim 4, wherein:
   the controller does not take into account a desired RPM setting when operating in the current limitation mode.

6. The method of claim 4, wherein:
   the controller utilizes a PID control when in the constant RPM mode.

7. The method of claim 6, wherein:
   the controller causes the RPM of the shaft to decrease below the desired RPM and increase back to the desired RPM in a periodic manner due to periodic variations in loading on the electric motor.

8. The method of claim 1, wherein:
measuring the input current supplied to the electric motor comprises periodically sampling, at a first sampling rate, an output signal of the current sensor;
measuring the RPM of the shaft of the electric motor comprises periodically sampling, at a second sampling rate, an output signal of the RPM sensor; and
the first and second sampling rates each have a greater frequency than a periodic drive signal used to drive the electric motor.

9. The method of claim 1, including:
using an electronic controller to determine the current limit using the substantially continuous function by calculating the output of a linear function using the measured RPM of the shaft as the input to the substantially continuous function.

10. The method of claim 1, including:
using an electronic controller to determine the current limit using the substantially continuous function by calculating the output of a non-linear function using the measured RPM of the shaft as the input to the substantially continuous function.

11. The method of claim 1, including:
using an electronic controller to determine the current limit using the substantially continuous function by retrieving a value which corresponds to the measured RPM of the shaft from a look-up table.

12. The method of claim 1, including:
using an electronic controller to reduce the RPM of the shaft along the substantially continuous function while increasing current supplied to the electric motor by, iteratively (i) reducing the RPM of the shaft by an increment, (ii) measuring a new RPM of the shaft, (iii) measuring a new input current, and (iv) determining a new current limit based on the new measured RPM of the shaft using the substantially continuous function, until the new input current is approximately equal to the new current limit.

13. The method of claim 1, wherein:
the portable appliance comprises a mixer including a base having an upstanding pedestal portion and a mixer head that is configured to releasably support a mixing element for rotation thereof, and:
a mixer bowl supported on the base.

14. A mixer comprising:
a user control operable to generate an input signal indicative of a desired RPM setting for the mixer;
an electric motor having a shaft configured to provide motive power to a mixing element, the electric motor defining a range of nonequal current limits that, if exceeded, damage the electric motor;
a current sensor configured to measure an input current supplied to the electric motor;
a revolutions-per-minute (RPM) sensor configured to measure RPM of the electric motor;
an electronic controller configured to (i) generate a motor control signal such that the RPM of the electric motor is maintained at the desired RPM speed setting when the controller is in a constant RPM mode, (ii) calculate a current limit based on measured RPM using a substantially continuous function which relates RPM of the electric motor to a range of nonequal current limits such that each RPM is associated with a specific predefined current limit, and wherein the RPM of the substantially continuous function decreases with increasing electrical current limit, and (iii) use a current limitation mode in which the motor control signal is modified, when the input current exceeds the current limit for the measured RPM according to the substantially continuous function, such that, when the electronic controller is in the current limitation mode, the RPM of the electric motor is reduced according to the substantially continuous function while the electrical current to the electric motor is maintained at a level that is approximately equal to the current limit for the measured RPM.

15. The mixer of claim 14, wherein:
the current signal exceeds the current limit when a pinch point occurs between the mixing element and a mixer bowl that receives the mixing element.

16. The mixer of claim 14, wherein:
the substantially continuous function comprises one of a linear function, a non-linear function, and a look-up table.

17. The mixer of claim 14, further comprising:
a driver circuit operable to generate a periodic drive signal to drive the electric motor in response to the motor control signal.

18. The mixer of claim 14, wherein:
the user control includes a finite number of desired RPM settings; and
the electronic controller is configured to cause the electric motor to operate at RPMs between adjacent RPM settings when in the current limitation mode.

19. The mixer of claim 14, including:
a base having an upstanding pedestal portion and a mixer head that is configured to releasably support a mixing element for rotation thereof, and:
a mixer bowl supported on the base.

* * * * *